United States Patent
Yamada et al.

(10) Patent No.: US 12,422,971 B2
(45) Date of Patent: Sep. 23, 2025

(54) DYNAMIC VISUALIZATION OF AN OBJECT TRACKED BY AN OBJECT TRACKING SYSTEM IN A GRAPHICAL USER INTERFACE

(71) Applicants: Atlassian Pty Ltd., Sydney (AU); Atlassian Inc., San Francisco, CA (US)

(72) Inventors: Pedro Tacla Yamada, Sydney (AU); Feihu Chen, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/565,261

(22) Filed: Dec. 29, 2021

(65) Prior Publication Data

US 2023/0205393 A1    Jun. 29, 2023

(51) Int. Cl.
*G06F 3/06* (2006.01)
*G06F 3/04817* (2022.01)
*G06F 3/0482* (2013.01)
*G06F 3/04847* (2022.01)
*G06F 3/0486* (2013.01)

(52) U.S. Cl.
CPC ........ *G06F 3/0482* (2013.01); *G06F 3/04817* (2013.01); *G06F 3/04847* (2013.01); *G06F 3/0486* (2013.01); *G06F 3/0605* (2013.01); *G06F 3/0643* (2013.01)

(58) Field of Classification Search
None
See application file for complete search history.

(56) References Cited

U.S. PATENT DOCUMENTS 10,496,962 B1 * 12/2019 Bartels .............. G06Q 10/1097
2007/0079249 A1 * 4/2007 Pall ......................... G06F 9/546
715/758

(Continued)

OTHER PUBLICATIONS

Screen captures from YouTube video clip entitled "Obsidian—How To Create Visual Boards Easily—Kanban Boards Plugin," 8 pages, uploaded Apr. 30, 2021 by user "Santi Younger." Retrieved from the internet: https://www.youtube.com/watch?v=vRZXT4ynKxE (Year: 2021).*

(Continued)

*Primary Examiner* — Irete F Ehichioya
*Assistant Examiner* — Samuel Shen
(74) *Attorney, Agent, or Firm* — Brownstein Hyatt Farber Schreck, LLP

(57) ABSTRACT

A method for dynamically re-sizing virtual board lists during a drag and drop operation. The method includes rendering a virtual board on a display including a first list and a second list, each having list objects. The method includes storing a total size of the first list and second list, and sizes of list objects in the first list and the second list in a corresponding first list cache and second list cache; detecting selection and movement of a list object from the first list to the second list; adding the size of the selected list object to the second list cache; and rendering and displaying a placeholder area of the selected list object, the placeholder area having the same size as the size of the selected list object, and displaying an increased size of the second list based on the updated total size of the second list.

12 Claims, 10 Drawing Sheets

(56) References Cited

U.S. PATENT DOCUMENTS

| | | | | |
|---|---|---|---|---|
| 2007/0220000 A1* | 9/2007 | Walsh | ............ | G06F 12/0842 |
| | | | | 711/E12.039 |
| 2017/0214726 A1* | 7/2017 | Malatesha | ............ | G06F 3/1454 |
| 2022/0206995 A1* | 6/2022 | Zadina | ............ | G06F 9/543 |
| 2022/0335362 A1* | 10/2022 | Nikain | ............ | G06Q 10/0633 |

OTHER PUBLICATIONS

Screen captures from YouTube video clip entitled "Using the Kanban Board," 7 pages, uploaded Dec. 7, 2016 by user "Microsoft Visual Studio." Retrieved from the internet: https://www.youtube.com/watch?v=VCpSBQmquRU (Year: 2016).*

Screen captures from YouTube video clip entitled "Using the Kanban Board," 9 pages, uploaded Dec. 7, 2016 by user "Microsoft Visual Studio." Retrieved from the internet: https://www.youtube.com/watch?v=VCpSBQmquRU (Year: 2016).*

Screen captures from YouTube video clip entitled "Obsidian—How To Create Visual Boards Easily—Kanban Boards Plugin," 18 pages, uploaded Apr. 30, 2021 by user "Santi Younger." Retrieved from the internet: https://www.youtube.com/watch?v=vRZXT4ynKxE (Year: 2021).*

Screen captures from YouTube video clip entitled "Which O365 Task Management Tool Should You Use?," 16 pages, uploaded Jun. 22, 2021 by user "Bulb Digital." Retrieved from the internet: https://www.youtube.com/watch?v=-KM3gsHTmQc (Year: 2021).*

Screen captures from YouTube video clip entitled "Which O365 Task Management Tool Should You Use?," 20 pages, uploaded Jun. 22, 2021 by user "Bulb Digital." Retrieved from the internet: https://www.youtube.com/watch?v=-KM3gsHTmQc (Year: 2021).*

* cited by examiner

DYNAMIC VISUALIZATION OF AN OBJECT TRACKED BY AN OBJECT TRACKING SYSTEM IN A GRAPHICAL USER INTERFACE

TECHNICAL FIELD

Aspects of the present disclosure are directed to rendering graphical user interfaces, and in particular, to rendering graphical user interfaces based on user interaction with the interface.

BACKGROUND

Various computer applications provide mechanisms for creating objects that represent items (for example tasks) and rendering those objects in a virtual board environment. Such computer applications generally rely on web pages to provide end users with information and functionality. In order to render a web page including the objects, a user device may retrieve data from a number of storage locations, including a server or other location, and processes that data to render the web page on the user device.

Each of the storage locations, which may contain data associated with certain objects, are often segregated from each other. When data is rendered with other segregated data, this data segregation can present limitations in respect of dynamic rendering where objects are transitioned with respect to each other.

SUMMARY

Example embodiments described herein are directed to a computer implemented method, including: rendering a virtual board on a display, the virtual board including at least a first list and a second list, the first and second lists each capable of having at least one list object, each at least one list object being transitionable between the first and second lists, each of the first and second lists including a droppable area within which a list object can be dropped; storing a total size of the first list and sizes of the at least one list object in the first list in a corresponding first list cache and storing a total size of the second list and sizes of the at least one list object in the second list in a corresponding second list cache; detecting selection of a list object from the first list and movement of the selected list object from the first list to a current position within the droppable area of the second list; obtaining the size of the selected list object from the first list cache and adding the size of the selected list object to the second list cache; updating the total size of the second list in the second list cache; inspecting the second list cache to determine the size of the selected list object and the total size of the second list; rendering and displaying a first placeholder area under the current position of the selected list object within the droppable area of the second list, the first placeholder area having the same size as the size of the selected list object; and displaying an increased size of the second list based on the updated total size of the second list.

Some example embodiments are directed to a computer processing system including: a processing unit; a communication interface; and a non-transitory computer-readable storage medium storing instructions. When these instructions are executed by the processing unit, they cause the processing unit to: render a virtual board on a display, the virtual board including at least a first list and a second list, the first and second lists each capable of having at least one list object, each at least one list object being transitionable between the first and second lists, each of the first and second lists including a droppable area within which a list object can be dropped; store a total size of the first list and sizes of the at least one list object in the first list in a corresponding first list cache and storing a total size of the second list and sizes of the at least one list object in the second list in a corresponding second list cache; detect selection of a list object from the first list and movement of the selected list object from the first list to a current position within the droppable area of the second list; obtain the size of the selected list object from the first list cache and add the size of the selected list object to the second list cache; update the total size of the second list in the second list cache; inspect the second list cache to determine the size of the selected list object and the total size of the second list; render and display a first placeholder area under the current position of the selected list object within the droppable area of the second list, the first placeholder area having the same size as the size of the selected list object; and display an increased size of the second list based on the updated total size of the second list.

Still other example embodiments are directed to a non-transitory storage medium storing instructions executable by processing unit to cause the processing unit to: render a virtual board on a display, the virtual board including at least a first list and a second list, the first and second lists each capable of having at least one list object, each at least one list object being transitionable between the first and second lists, each of the first and second lists including a droppable area within which a list object can be dropped; store a total size of the first list and sizes of the at least one list object in the first list in a corresponding first list cache and storing a total size of the second list and sizes of the at least one list object in the second list in a corresponding second list cache; detect selection of a list object from the first list and movement of the selected list object from the first list to a current position within the droppable area of the second list; obtain the size of the selected list object from the first list cache and add the size of the selected list object to the second list cache; update the total size of the second list in the second list cache; inspect the second list cache to determine the size of the selected list object and the total size of the second list; render and display a first placeholder area under the current position of the selected list object within the droppable area of the second list, the first placeholder area having the same size as the size of the selected list object; and display an increased size of the second list based on the updated total size of the second list.

Figure 1:
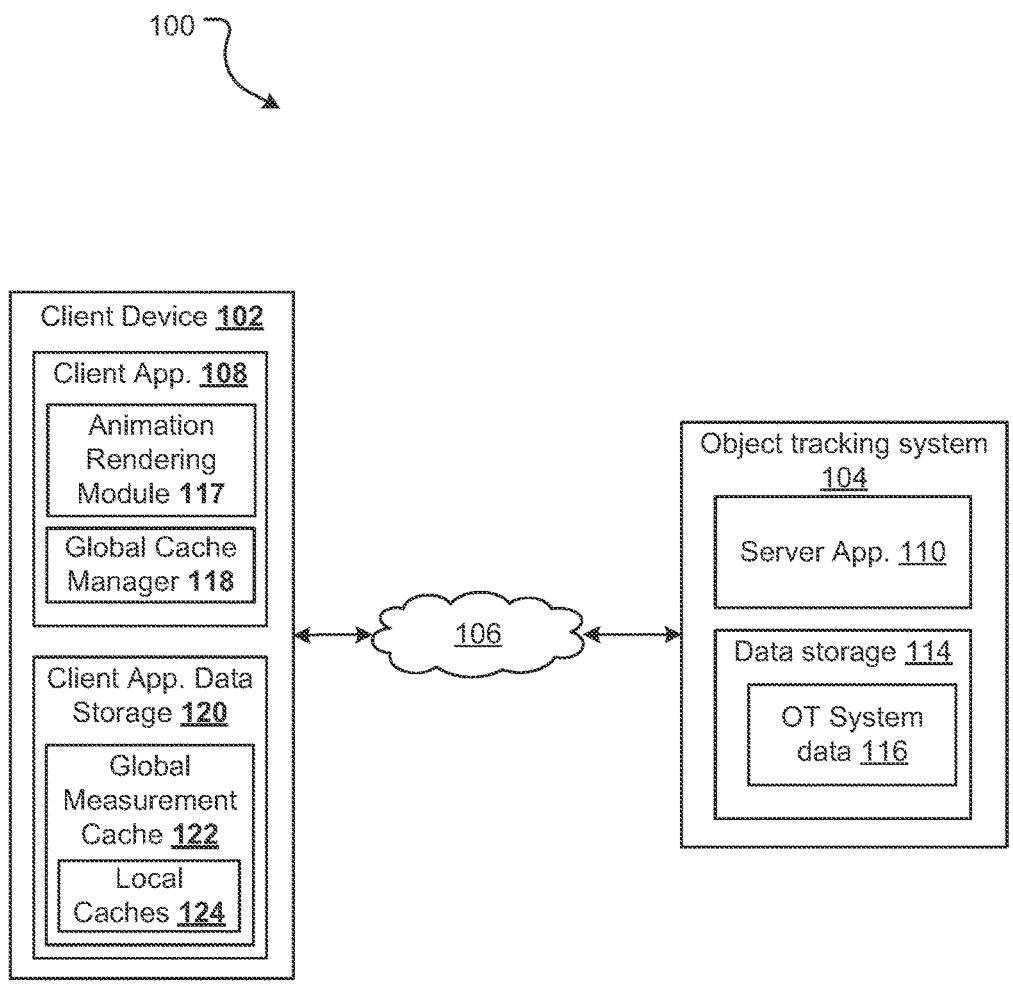
FIG. 1 is a block diagram of an object tracking application according to aspects of the present disclosure.

While the description is amenable to various modifications and alternative forms, specific embodiments are shown by way of example in the drawings and are described in detail. It should be understood, however, that the drawings and detailed description are not intended to limit the disclosed embodiments to the particular form disclosed herein. The intention is to cover all modifications, equivalents, and alternatives falling within the scope of the present disclosure as defined by the appended claims.

DETAILED DESCRIPTION

In the following description numerous specific details are set forth in order to provide a thorough understanding of various embodiments described herein. It will be apparent, however, that the embodiments described herein may be practiced without these specific details. In some instances, well-known structures and devices are shown in block diagram form in order to avoid unnecessary obscuring.

Very generally, various computing applications and systems (such as object tracking systems) provide mechanisms for creating and rendering objects, object states, and transitioning objects between states within a virtual board environment.

As used herein, an object tracking system (or object tracking application) is any system (or application) that at least facilitates the tracking of objects between states and visualisation of objects in object states by generation, rendering and display of virtual boards.

One example of an object tracking application (as referred to in the present context) is Trello. Trello allows users to create objects in the forms of cards or list objects and object states in the form of lists. In order to change a list object state in Trello an object item is transitioned from one list to another. For example, a Trello user may set up a virtual board (a list of lists) having one or more lists such as "To Do," "In Progress," "Completed." A user may then create cards in respect of particular tasks that need to be done and add them to the "To Do" list: for example a "grocery shopping" card, a "washing up" card, an "organise house party" card, and so on.

A further example of what the present disclosure refers to as an object tracking application is Jira. Jira allows users to create objects in various forms, for example, issues or, more generally, work items. A work item in Jira is an object with associated information and an associated workflow, that is, a series of states through which the work item transitions over its lifecycle. Any desired workflow may be defined for a given type of work item. An example workflow is that used by a service desk handling issue work items. Such a workflow defines the states that a given issue can take and the permitted transitions between states, for example: an open state, in progress state; a resolved state; a closed state; and a reopened state. Different workflows with different states and/or transitions between states will be appropriate for different implementations.

As an alternative example, Jira can be configured to track software development projects. In this case, such a workflow includes a given work item that can have (and transition between) the states of: to do (for example, work that has not yet been started); in progress (for example, work that is currently being done); code review (for example, work that has been completed but requires review before being deployed); and done (for example, work that is completely finished).

In the case of the example Jira workflows described above, work items in a particular project may be presented as cards in a virtual project board, where the various workflow states define columns of the board.

Further examples of what the present disclosure refers to as an object tracking application are Bugzilla, and Asana, to name but a few. Object tracking applications provide user interfaces for displaying the current state of objects maintained by the application and allowing users to transition objects (such as cards in Trello, work items in Jira) between states. In both Trello and Jira, such user interfaces are referred to as virtual boards.

Typically, the cards/objects displayed in virtual boards are interactive and/or 'draggable.' That is, these items can be moved from one location to another in the virtual board based on user input control via a keyboard, mouse, or touchscreen. Further, the lists in the virtual boards are 'droppable.' That is, the area of the user interface occupied by a list is a droppable area in which draggable cards/object can be dropped. Accordingly, users can move cards around within a particular column, for example, by selecting and dragging or other means, to change the order of cards in the column. When a card is moved within the list, the state of the object does not change. For example, a card that is positioned at the top of a list can be moved to a chosen position lower down that same list such that the object state does not change, only the position of the object within the state is changed.

Further, users can transition cards between columns/lists, for example, by selecting and dragging or other means, from its current list to another one, which is referred to herein as a completed transition (to be described in further detail below). For example, once the user has completed grocery shopping (in the Trello example described above) they can select and drag the corresponding card from the "To Do" list to be dropped into the "Completed" list. If the user has started but not completed work on their house party task they can select and drag the corresponding card from the "To Do" list to be dropped into the "In Progress" list. Similarly, in the Jira example described above, when a work item needs to be progressed from one workflow state to another, the corresponding work item card can be selected and dragged from its current column to the column associated with the next state for the work item.

Each card in a virtual board typically has its own card contents. Card contents includes but are not limited to one or more of: text; icons; pictures; and video. The card contents will define the actual size of the card that is rendered, as the more card content the larger the card size. Further, it will be appreciated that card width may be fixed or may change based on the number of columns in the board and/or the screen size. The card height on the other hand may change based on the content of the card. As such, any reference herein to a change in card size refers to a change in the card height unless explicitly described otherwise.

In order to improve the user experience when dragging and dropping objects within the virtual board and to allow users to feel like they are moving physical objects around some techniques provide a way to 1) animate the transition of the selected object from its original location to its destination, 2) animate other objects in the destination moving out of the way of the dragged object so that it can be dropped at the desired destination, and 3) animate the drop of the object into its new position to more clearly display the drag effect.

However, known techniques for providing this animation during a drag and drop operation may suffer some issues. For example, some of these techniques may introduce default-sized placeholders at the original and destination locations during the drag and drop operation or may not accurately increase the size of the destination list. This can be jarring for the user and can lead to an unsatisfactory user experience during the drag and drop operation in virtual boards.

Aspects of the present disclosure address one or more of the issues with these techniques by providing a more accurate user experience during a drag and drop operation. In particular, aspects of the present disclosure provide rendering methods and systems that can accurately size placeholders in the original and destination locations based on the size of the dragged card and can accurately size the destination column during animation of the drag and drop operation. The systems and methods used to provide this functionality are described in the following sections.

Example System

In the following, a networked environment and computer processing system configurable to implement various features and techniques are described. Following this, example computer implemented methods for rendering object state transitions will be described.

FIG. 1 depicts one example of a networked environment 100 in which the various operations and techniques described herein can be performed. Networked environment 100 includes a client device 102 and an object tracking system 104 which communicate via one or more communications networks 106.

The client device 102 and object tracking system 104 (or, more specifically, applications running on those systems) operate together to provide various functionality. The specific functionality provided will depend on the system in question, but can include, for example, allowing a user (interacting with object tracking system 104 via a client application 108 running on their client device 102) to: define object states; create objects and assign them to states; move objects between states; and (as described in detail below) to initiate and complete transition of objects.

Accordingly, client device 102 hosts client application 108 which, when executed by client device 102, configures client application 108 to provide client-side functionality/interact with object tracking sever system 104 (or, more specifically, server application 110 running thereon). Client side functionality includes, for example, rendering user interfaces by which a user interacts with the object tracking system 104.

Generally speaking, the client application 108 maintains a client application data storage 120 for providing data relevant to client application 108 while the client application is executing on the client device 102. The client application data storage may store a global measurement cache 122 that maintains measurement data for a portion of a virtual board displayed on the client device 102 at any given moment and includes dimensions of the visible lists and objects in the virtual board. In particular, the global measurement cache 122 stores local caches for each visible list of the virtual board that store and maintain dimensions of the corresponding lists and their objects. In some embodiments, the virtual board data may be maintained in-memory (e.g., in RAM) while the application is executing and the virtual board is displayed on the client device 102. Once the virtual board or client application is closed, the virtual board data (such as the cache data) is flushed from the memory and not stored in a persistent manner.

Client application 108 includes an animation rendering module 117 that is configured to render animations during drag and drop events. The client application 108 also includes a global cache manager 118, which is configured to measure rendered objects/lists and store the measurement data in the global measurement cache 122 within client application data storage 120. The global cache manager 118 is also configured to determine the position of an object during a drag and drop event, retrieve sizing information of the object from the source local cache and provide this information to the local caches of the destination list associated with the drag and drop event. It will be appreciated that the global cache manager 118 performs these functions during the dragging/hovering portion of the drag and drop event and not once the object has already been dropped in a destination list.

In some embodiments, client application 108 is a web browser application (such as Chrome, Safari, Internet Explorer, Opera, or an alternative web browser application) which accesses the server application 110 via an appropriate uniform resource locator (URL) and communicates with server application 110 via general world-wide-web protocols (for example, http, https, ftp). By way of a non-limiting example, in other embodiments, client application 108 is a specific client application programmed to communicate with server application 110 using defined application programming interface (API) calls.

In some embodiments, a client device 102 is able to have more than one client application 108, for example, both a general web browser application and a dedicated programmatic client application.

Object tracking system 104 hosts a server application 110. The server application is executed by the object tracking system 104 to configure it to provide server-side functionality to one or more corresponding client applications (for example, 108 as discussed above). Server application 110 includes one or more application programs, libraries, APIs or other software elements that implement the features and functions that are described herein. For example, where client application 108 is a web browser, server application 110 will be a web server such as Apache, IIS, nginx, GWS, or an alternative web server. Where client application 108 is a specific application, server application 110 will be an application server configured specifically to interact with that client application 108.

In some embodiments, object tracking system 104 is provided with both web server and application server modules.

Object tracking system 104 includes, or has access to, data storage 114. Data storage may be any data storage device or system, ranging, for example, from a database server and database (which could span several physical systems) to a simple storage device and file structure. Data storage 114 is used to store data relevant to the services being provided by the object tracking system 104. In the illustrated example, the data storage 114 stores object tracking system data 116. Object tracking system data 116 is data used for the normal operation of object tracking system 104, for example card contents, user account data, permissions data, object type definitions, state transition workflows (where relevant, that is permissible state transitions), instantiated objects (that is specific objects created in accordance with object type definitions), amongst others.

Object tracking system data 116 is described herein as being maintained in data storage 114. In some embodiments, object tracking system data 116 is stored on a separate data storage system.

In some embodiments, by way of a non-limiting example, object tracking system data may also be stored in client application data storage 120 along with state transition rendering data.

Client device 102 and object tracking system 104 communicate data between each other either directly or indirectly through one or more communications networks 106. Communications network 106 may include a local area network (LAN), a public network, or a combination of networks.

While object tracking system 104 of environment 100 is depicted and described as a single server machine alternative architectures are possible. For example, in certain cases a clustered server architecture may be used where multiple server computing instances (or nodes) are instantiated on one or more computer processing systems to meet system demand.

Conversely, in the case of small enterprises with relatively simple requirements, object tracking system 104 may be a stand-alone implementation (that is a single computer directly accessed/used by end users). Further, while a single client device 102 has been illustrated object tracking system 104 is capable of, and indeed is designed for, serving/interacting with multiple client devices 102.

Client device 102 may be any computer processing system which is configured (or configurable) by hardware and/or software to offer client-side functionality. Similarly, object tracking system 104 may be any computer processing system which is configured (or configurable) by hardware and/or software to provide server-side functionality. Typically, server systems are more powerful (from a computer processing perspective) than client devices but this is not always the case. By way of a non-limiting example, while object tracking system 104 will typically be implemented on server hardware, suitable client devices may include desktop computers, laptop computers, netbook computers, tablet computing devices, mobile/smart phone devices, and other computer processing devices.

One example of a computer processing system is described below with reference to FIG. 2.

Various embodiments and features of the present disclosure are implemented using one or more computer processing systems.

Figure 2:
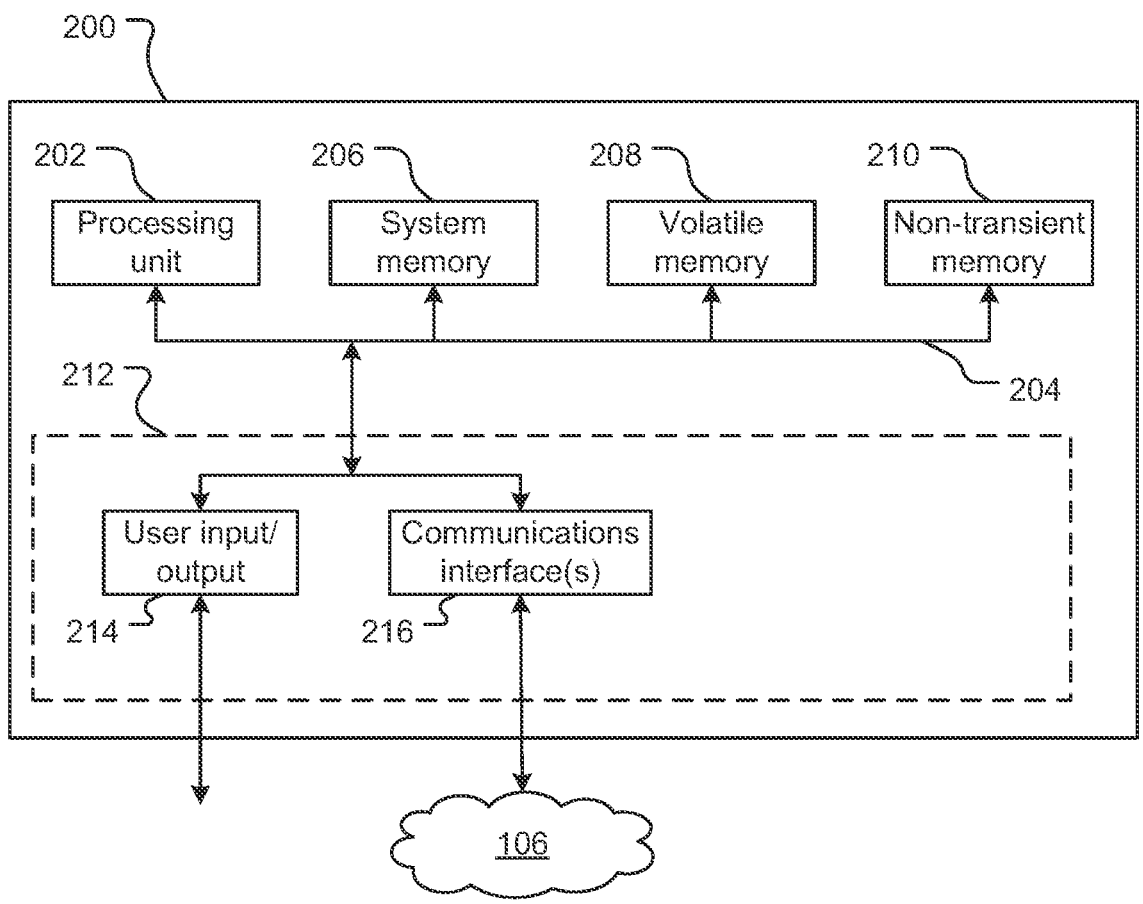
FIG. 2 is a block diagram of a computing system with which various embodiments of the present disclosure may be implemented/configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted. However, system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

System 200 includes at least one processing unit 202. Processing unit 202 may be a single computer processing device (for example, a central processing unit, graphics processing unit, or other computational device), or may include a plurality of computer processing devices. In some instances all processing will be performed by processing unit 202. However, in other instances processing may also be performed by remote processing devices accessible and useable (either in a shared or dedicated manner) by system 200.

Through a communications bus 204, processing unit 202 is in data communication with a one or more machine readable storage (memory) devices which store instructions and/or data for controlling operation of system 200. In this example, system 200 includes a system memory 206 (for example, a BIOS), volatile memory 208 (for example, random access memory such as one or more DRAM modules), and non-transient memory 210 (for example, one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (for example, networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. In other embodiments, other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). In other embodiments, other wireless connections are possible.

Generally speaking, and depending on the particular system in question, devices to which system 200 connects, whether by wired or wireless means, include one or more input devices to allow data to be input into/received by system 200 for processing by processing unit 202, and one or more output devices to allow data to be outputted by system 200. Example devices are described below. However, it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include one or more display devices such as CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 also connects to one or more communications networks (for example, the Internet, a local area network, a wide area network, and/or a personal hotspot, amongst others) to communicate data to and receive data from networked devices, which may themselves be other computer processing systems.

System 200 may be any suitable computer processing system such as, by way of non-limiting example, a server computer system, a desktop computer, a laptop computer, a netbook computer, a tablet computing device, a mobile/smart phone, a personal digital assistant, a personal media player, a set-top box, a games console.

Typically, system 200 will include at least user input and output devices 214 and a communications interface 216 for communication with a network such as network 106 of environment 100.

System 200 stores or has access to computer applications (also referred to as software or programs), that is, computer readable instructions and data which, when executed by the processing unit 202, configure system 200 to receive, process, and output data. Instructions and data can be stored on non-transient machine readable storage medium accessible to system 200. For example, instructions and data may be stored on non-transient memory 210. Instructions and data may be transmitted to/received by system 200 via a data signal in a transmission channel enabled (for example) by a wired or wireless network connection.

Applications accessible to system 200 will typically include an operating system application such as Microsoft Windows®, Apple OSX, Apple IOS, Android, Unix, or Linux, and so on.

System 200 also stores or has access to applications which, when executed by the processing unit 202, configure system 200 to perform various computer-implemented processing operations described herein. For example, and referring to the networked environment of FIG. 1 above, client device 102 includes client application 108 which configures client device 102 to perform the described client system operations, and object tracking system 104 includes server application 110 which configures object tracking system 104 to perform the described server system operations.

In some cases, part or all of a given computer-implemented method will be performed by system 200 itself, while in other cases processing may be performed by other devices in data communication with system 200.

Referring to FIGS. 3A to 3E, there is illustrated an example virtual board 300 at various points in time. Board 300 includes three columns, each corresponding to a state (or list in the present context): list A 302; list B 304; and list C 306. Board 300 also includes several visual representations of objects (list objects or cards in the present context), each of which is located in a particular list/column according to the current state of the object. More specifically, board 300 includes the following cards: a card I 310; a card II 312; a card III 314; and a card IV 316. Each of the cards has an associated card height, where card I 310 has a height 320; card II 312 has a card height 322; card III 314 has a card height 324; and card IV 316 has a card height 326. The card height is dependent on the contents of the card and may change when the contents of a card is changed by the user. It will be appreciated that each of the list/columns on board 300 (that is, the states of: list A 302, list B 304 and list C 306) define droppable areas and are also draggable themselves. That is, a user can re-arrange the lists/columns in any desired order by dragging and dropping the lists on the user interface (for example, the currently illustrated order of list A 302; list B 304 then list C 306 can be changed to any one of: list C 306, list A 302 then list B 304; list C 306, list B 304 then list A 302; list B 304, list C 306, then list A 302; list B 304, list A 302, then list C 306; and list A 302; list C 306 then list B 304). Further, any of the objects within a given list are draggable to a droppable area within the same list or to a droppable area within another list, the process for doing so to be described in greater detail below.

Further, at the bottom of the lowest card of each list, there is an "Add card" button 330 that when pressed allows the user to create a new card in the respective list. Button 330 may appear at the top or bottom in all lists or may be centrally provided at one other location in the user interface (e.g., in a top or bottom ribbon of the user interface). In other embodiments, there may be a single instance of button 330 that appears at the bottom or top of a list when a cursor hovers over that list. In this other embodiment, the location of the button 330 moves depending on the location of the cursor and which list it is presently hovering over.

Figure 3A:
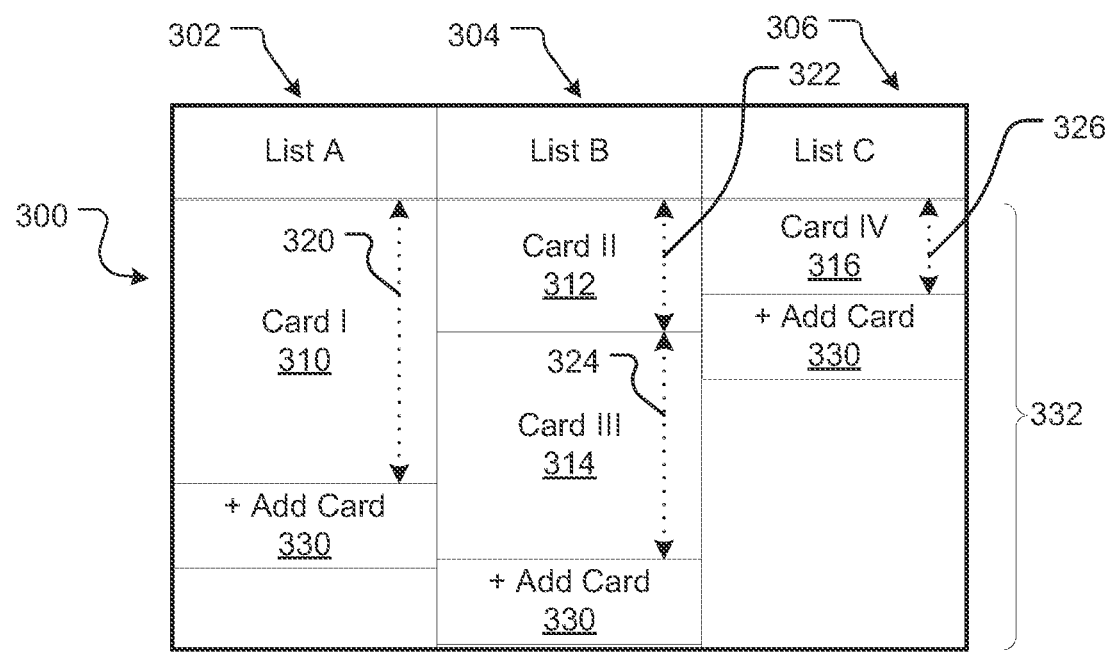
FIGS. 3A to 3E depicts a sequence of an example point in time object state transition.

Referring now to FIG. 3A, showing board 300 at a first point in time, card I is within list A, card II and card III are both within list B with card II above card III in that list, and card IV is within list C. Each of list A 302, list B 304 and list C 306 has a list height which is the cumulative height of the cards currently within the list and in some embodiments also includes the standard height of button 330. The part of board 300 that includes the cards and button 330 also has a dynamic height 332 that is approximately equal to the greatest list height of the lists on the board, in this case the height of list B 304 which has a greater list height than list A 302 and list C 306.

Figure 3B:
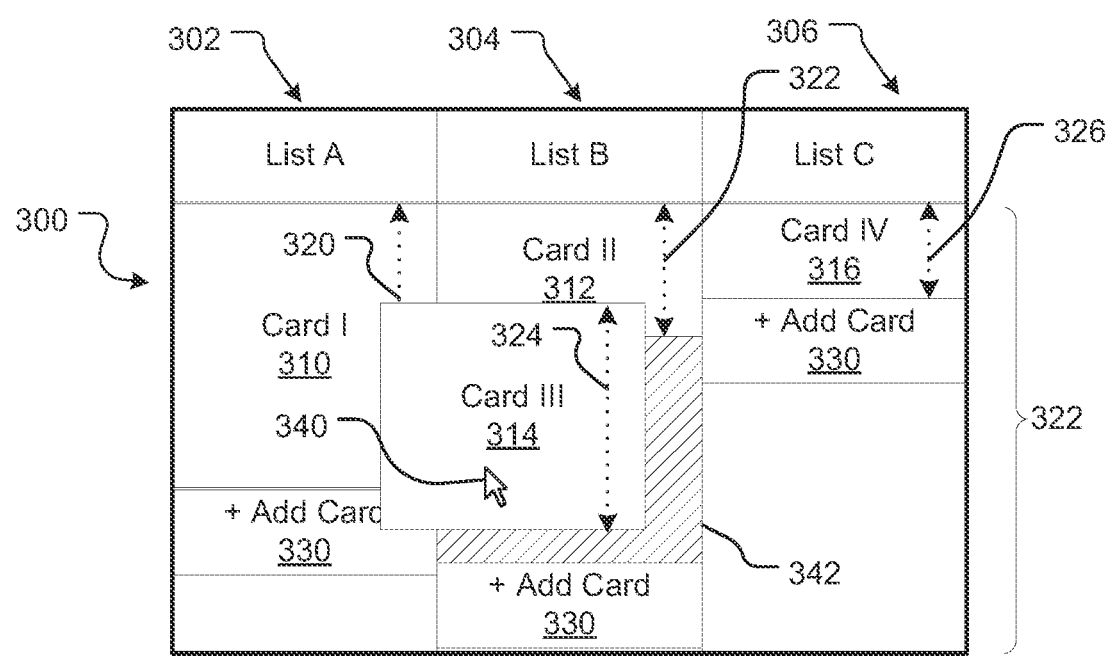

Referring to FIG. 3B, showing board 300 at a second point in time, where the user has initiated a drag and drop operation on card III by selecting card III with a cursor 340 and dragging card III from its original position on list B. This initiation of the drag and drop operation is also referred to herein interchangeably as a transition or transition event.

The cursor 340 at this stage is still hovering over a droppable area overlaying list B 304 and has not yet moved into a droppable area overlaying another list on the board. At this stage, the animation rendering module 117 generates an animation showing card III is moved (e.g., by a distance that corresponds to the distance by which the cursor has moved from its original position when the drag operation started to its current position), and adding a placeholder area 342 (also known as a "non-visible" object) that is the same size as card III in the original or home position of card III.

In some cases, the placeholder area 342 is displayed in the original position from the moment the card dragging operation commences and until the cursor 340 is detected to be within the droppable area of list A. This display of the placeholder area allows a user to remember where the card was originally positioned and also indicates the destination position of card III if the user were to end the drag operation at this point.

Figure 3C:
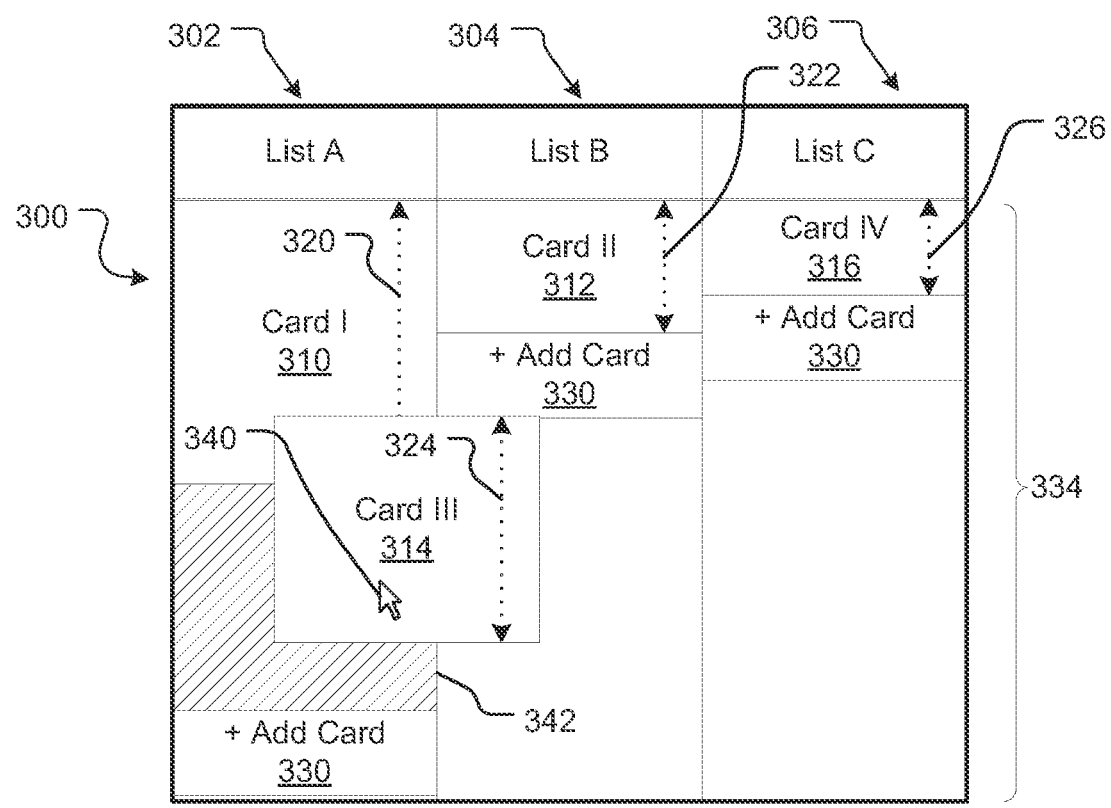

Referring to FIG. 3C, showing board 300 at a third point in time, where the user has dragged card III such that cursor 340 is now hovering over a droppable area overlaying list A. Once cursor 340 passes from the droppable area overlaying list B to the droppable area overlaying list A, the animation rendering module 117 adds a corresponding placeholder area 342 in list B at the position of the cursor 340. If other cards were present in this position, the animation rendering module pushes down the positions of each of those cards by a distance corresponding to the height of the placeholder area.

In some cases, it may remove the placeholder area 342 from list A. In other cases, the placeholder area may remain in list A, while the corresponding placeholder area is also added to list B.

It is noted that placeholder area 342 still corresponds to card III and it therefore maintains the same size. Card III is therefore moved out of list B so the corresponding placeholder area has also moved. The moving of placeholder area 342 from list B to list A also causes the animation rendering module to change the heights of list B and list A. Specifically, the height of list B will be decreased as card III (and placeholder area 342) is removed from list B, and the height of list A will increase as placeholder area 342 is added to list A. In this case, this causes board 300 to have a new dynamic height 334 that is approximately equal to the greatest list height of the lists on the board 300, which has now changed to the height of list A.

It will be appreciated that card III can be dragged back to its original position in list B and if that occurs, board 300 would go back to what is illustrated in FIG. 3B.

Figure 3D:
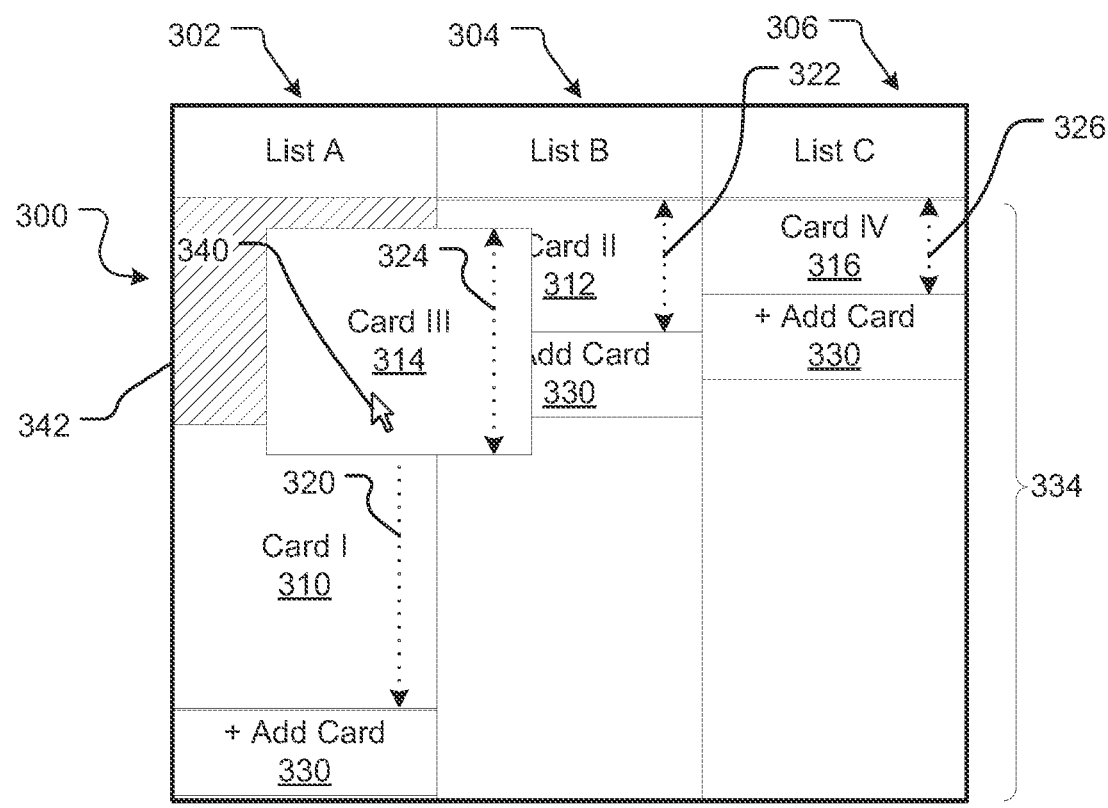

Referring to FIG. 3D, showing board 300 at a fourth point in time, where the user has dragged card III such that cursor 340 is now hovering over a list area overlaying list A that was previously the location of card I. Once cursor 340 passes from the list area overlaying list B below the previous location of card I to the list area overlaying list A that was previously the location of card I, placeholder area 342 moves to the top of list A where card I was previously located. In turn card I moves below placeholder area 342. The height of list A, as well as list B and list C, does not change from the third point in time to the fourth point in time as the number of objects within each list does not. Therefore, dynamic height 334 also does not change. Should list A include more than the cards shown in FIGS. 3A to 3E, each of the cards at and below the current position of cursor 340 dragging card III are moved downwards within list A to accommodate the placeholder area. For example, if list A had three cards and card III was dragged to the top position of list A 302, then each of the three existing cards would be moved down list A to accommodate the placeholder area 342.

Figure 3E:
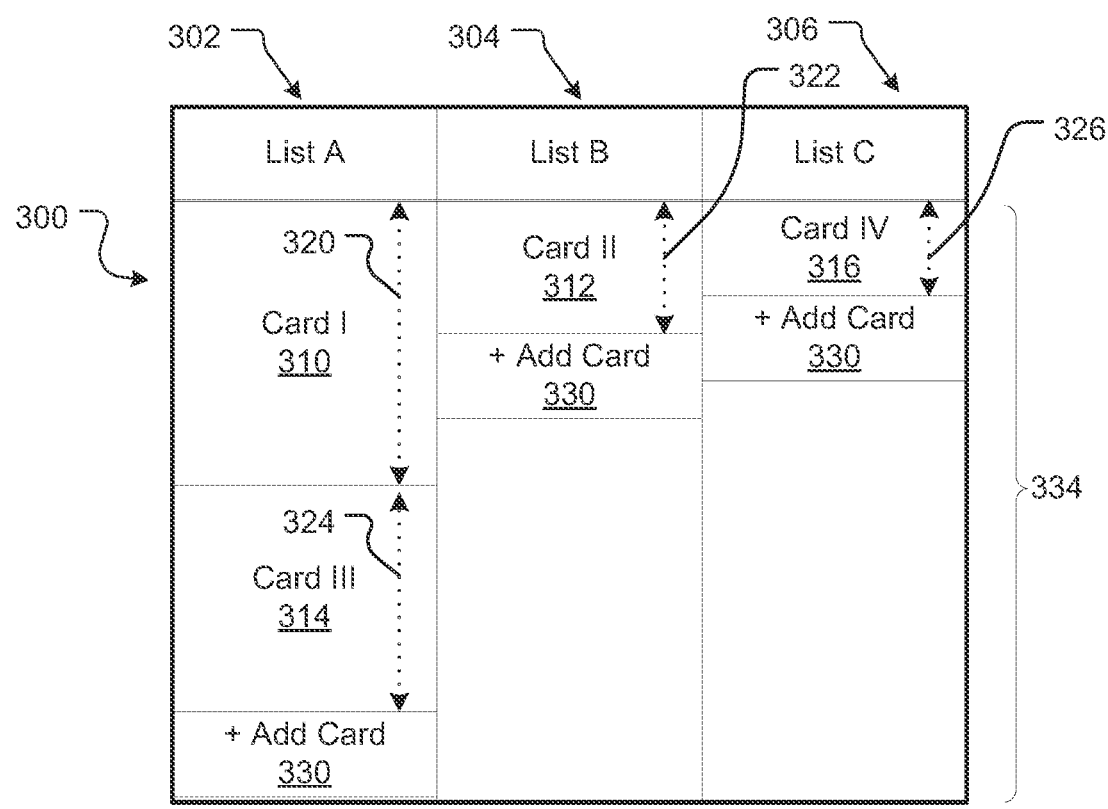

It will be appreciated that card III and cursor 340 can be moved back so that cursor 340 is below the previous location of card I and if that occurs, the animation rendering module 117 would render board 300 to match the board 300 illustrated in FIG. 3C. Assuming this occurs, FIG. 3E shows board 300 at a fifth point in time, where the user has dropped (that is, deselected by cursor 340) card III after cursor 340 has moved back to hovering over the list area overlaying list A below the previous the location of card I. Card III is therefore transitioned to list A 302 and dropping card III on this list completes the drag and drop operation. This completion of this drag and drop operation is also referred to as a card event. The height of list A 302, as well as list B 304 and list C 306, does not change from the fourth point in time to the fifth point in time as the objects within each list does not change. Therefore, dynamic height 334 also does not change.

In the description of FIGS. 3A-3E above, it is assumed that the animation and switching of the placeholder area from a source list to a destination list occurs based on the position of the cursor on the user interface. In other embodiments, this switching may be determined based on the centre of gravity of the selected card—regardless of where the cursor grabs and initiates the drag operation from. The card placeholder switches from the source list to a next list when the centre position of the card crosses the boundary of the droppable area of a list. Further, resting cards will move out of the way of a dragged card when the centre position of the dragged item crosses the edge of the resting card. In other words, once the centre position of the dragged card crosses the edge of another resting card in a list, the resting card moves out of the way and a card placeholder is created for the dragged objection in that position.

It will be appreciated that a transition or dragging event can be initiated by selecting and dragging an object (for example, any of the cards of FIGS. 3A to 3E) from its initial location. However, as referred to herein, that operation is completed as a transition or 'card event' only when the object is dropped at a different location. It is possible for a dragging operation to be initiated but where the object is dropped back at its initial location, the operation is not referred to as a transition or card event in this disclosure. For example, if card III was dropped after the second point in time, it would be dropped at its initial location and the transition will not be completed as board 300 will go back to its form at the first point in time prior to card III being selected.

As noted above, the data in respect of the content of each object and each state, that is object tracking system data 116, is stored in data storage 114. In order to render the lists on a virtual board, client application 108 performs a rendering action whereby object tracking system data 116 is obtained from the object tracking system 104 and used to render the virtual board including each state (that is, each list) and each object (that is, each card) of the virtual board. After the board is rendered, the height of each object and each state is measured by global cache manager 118 and stored in the list caches in client application data storage 120.

The aforementioned dynamic re-sizing of lists is such that known libraries for rendering, such as the various React JavaScript libraries, are not suitable to visually support the transitions described above. For example, board 300 at the third point in time shown in FIG. 3C, would not be able to be rendered in this fashion. Instead, at the third point in time, previously known techniques may render and display a default-sized placeholder area 342. In addition or alternatively, previously known rendering techniques may also not be able to accurately increase the height of list A as shown in FIG. 3C. Instead, they might increase the list height by a default amount or not increase the list height at all until the drop event is completed.

This is because in previously known techniques, rendering modules were configured to inspect the local cache 124 for a destination list when attempting to resize that list or add placeholders in that list. However, as the local cache for the destination list does not include the sizing information of the dragged card (which is present in the cache of another list). The local cache 124 of a given list is typically only updated with this information after the dragged card has been dropped in the list. Therefore, when the render module inspects the local cache for list A at the point in time depicted in FIG. 3C, the rendering module does not have access to the size of card III and therefore does not display an increased size of list A while the card is hovering over list A and may display placeholder area 342 having a default size. Thus, in known libraries, any placeholder areas for objects or height changes in lists may only be rendered and displayed using one or more default size measurements, not using the exact height measurement of the hovering object.

Example Methods

Figure 4:
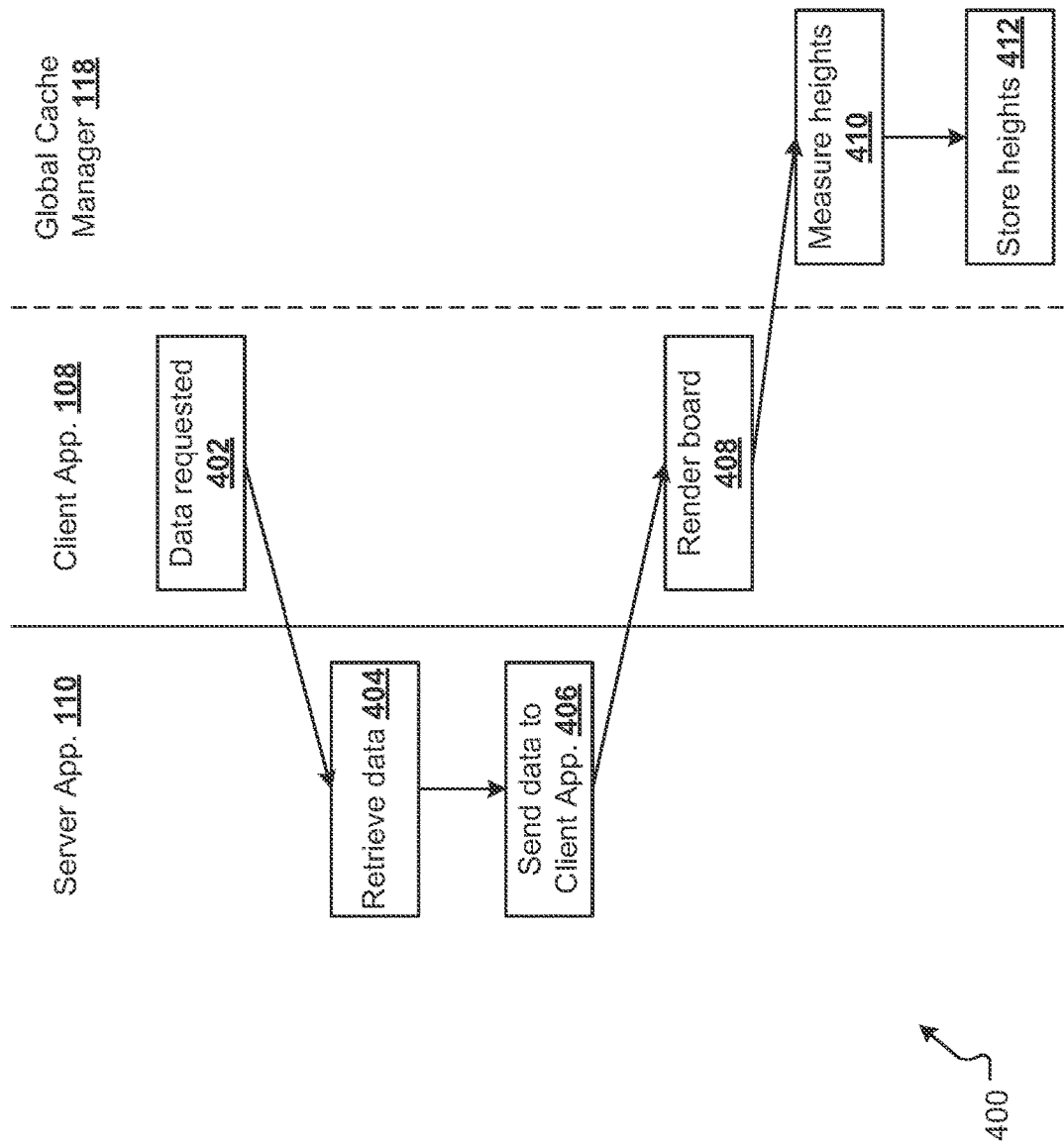
FIG. 4 provides a flowchart indicating data flows of operations performed when rendering the display of FIG. 3A.

Referring to FIG. 4, a data flow process 400 of the rendering of the example of FIG. 3A is described. At 402, client application 108 is accessed by a user in order to indicate that there is a desire to render board 300 of FIG. 3A. This may involve the user accessing client application 108, entering a URL to access object tracking system 104, and entering user account login details including a username/email address and a password. Logging into object tracking system 104 essentially requests object tracking system data 116 for that user's account from data storage 114 via server application 110 which is used to render board 300. In other embodiments, the username/email address and associated password are stored in client application data storage 120 and are automatically populated when the URL for object tracking system 104 is accessed.

Once object tracking system 104 is accessed by the user through client application 108, at 404, server application 110 retrieves object tracking system data 116 associated with the user's account from data storage 114.

At 406, object tracking system data 116 is subsequently provided to client application 108 and, at 408, client application 108 renders a board (e.g., board 300) based on provided object tracking system data 116.

Following the rendering of board 300, at 408, the global cache manage 118 measures the heights (in terms of number of pixels) of each object (card) and state (list). For example, in the case of the board 300 displayed in FIG. 3A, the global cache manager 118 measures the heights of each of: list A and the card(s) within list A, in this case only card I; list B and the cards within list B, in this case card II and card III; and list C and the card(s) within list C, in this case only card IV.

Then, at 410, the global cache manager 118 creates local caches 124 for each of the rendered/displayed lists A-C and stores these caches in the client application data storage 120. Each local cache may stores the dynamic height of the list, the width of the list, the height and width of individual objects in the list (along with their unique object identifier, which may be based on the list identifier and position of the object in the list) and the number of objects in the list. The global cache manager 118 may manage these local caches in the global measurement cache 122.

Figure 5:
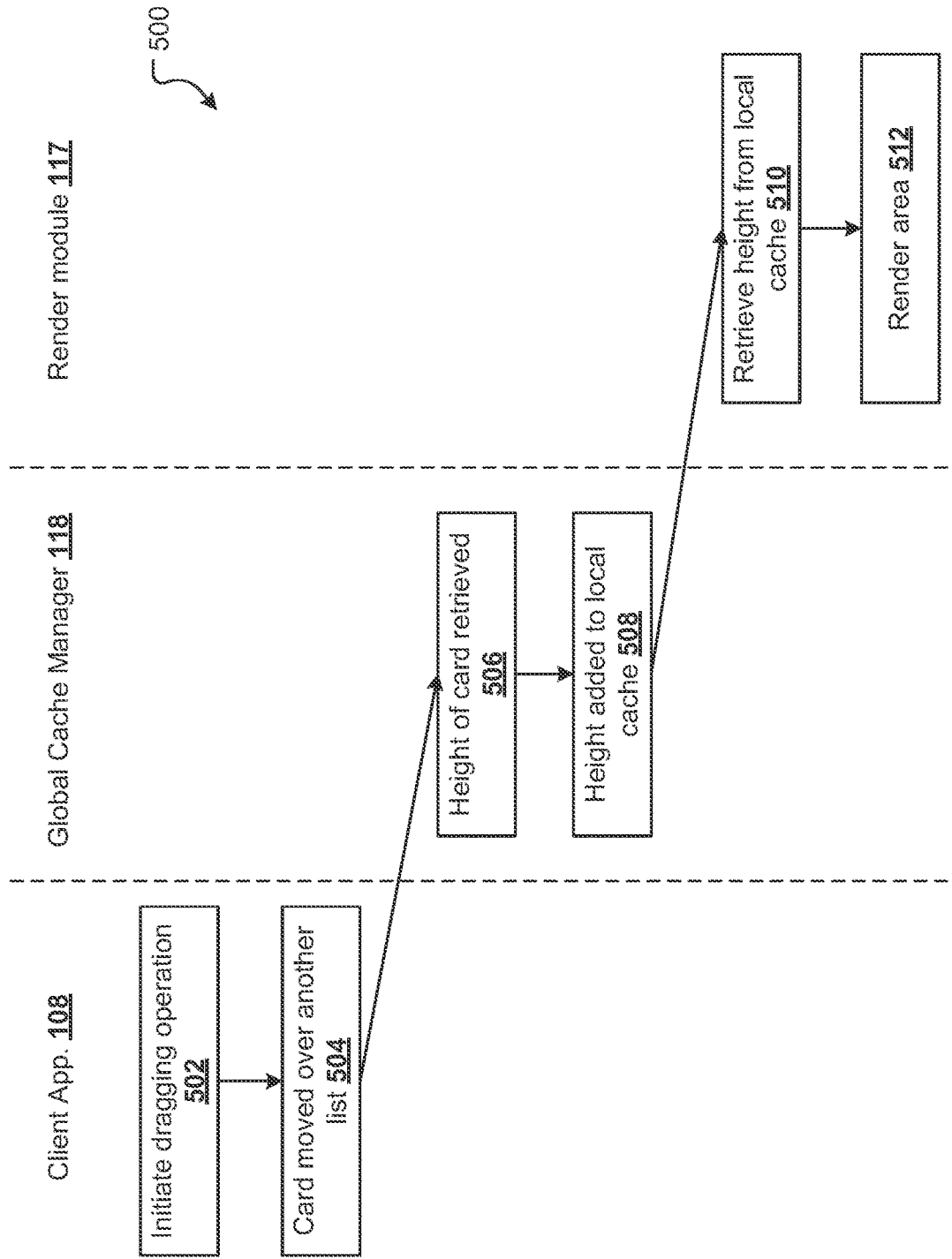
FIG. 5 provides a flowchart indicating data flows of operations performed when rendering the display of FIGS. 3B and 3C.

Referring to FIG. 5, a data flow process 500 of animating a drag and drop operation is described. This process 500 is described based on the dragging event shown of FIGS. 3B and 3C. At 502, the user initiates a dragging operation a card (e.g., card III 314). When the user selects this card and drags it (but maintains cursor 340 hovering over the droppable area overlaying list B 304), the animation rendering module 117 is activated. It inspects the local cache for list B, and retrieves card III's height. It then generates and displays a placeholder area (e.g., placeholder area 342) based on the retrieved card height.

Further, at step 502, when the client application 108 detects the drag event, the global cache manager 118 is alerted and provided the card identifier of the dragged card.

At 504, the client application 108 determines that the dragging operation has moved the selected card out of the droppable area overlaying the original list of the card and into the droppable area of another list in the virtual board 300. The client application 108 fires an event to the global cache manager 118 indicating which card is being dragged and over which list it is being hovered.

At 506, the global cache manager 118 accesses the local cache 124 of the source list (e.g., list B) with the card identifier of the dragged card to retrieve the height of the dragged card and at 508 adds this height information to the local cache of the list on which the dragged card is hovering (e.g., list A). In some examples, it may also removes this card and corresponding height information from the local cache of the source list (e.g. list B) at 508. In other examples, the local cache of the source list remains unchanged while the card is still hovering (and hasn't been dropped).

Thereafter, at 510, the animation rendering module 117 retrieves the list height information from list A's local cache 124. Once the animation rendering module 117 retrieves the height of card III and the height of the entire list A, at 512, the render module 117 generates and displays placeholder area 342 of the size of card III and increases the overall height of list A based on the size of card III. It also removes any placeholder area from the original list (e.g., list B) and reduces the size of the list based on the update height information available in the original list's local cache 124.

It will be appreciated that once the height of card III is added to list A's cache, when the user selects card III and drags it to another location within list A, e.g., down list A as shown in FIG. 3D, the animation rendering module 117 renders the placeholder area 342 in another location in the list (without adjusting the height of the list) based on the size of the selected card. In such in-list card transitions, the global cache manager 118 remains inactive and does not need to update any local caches. By way of a non-limiting example, whilst a cursor dragging an object remains hovering over the droppable area of a single list (that is, does not cross over into the droppable area over another list), there is no need for the global cache manager 118 to re-obtain any size measurements from the global measurement cache 122. Instead, the global cache manager 118 retrieves and feeds card and/or list height data when it determines that a dragged card has crossed from the droppable area in one list to the droppable area in another list.

Figure 6:
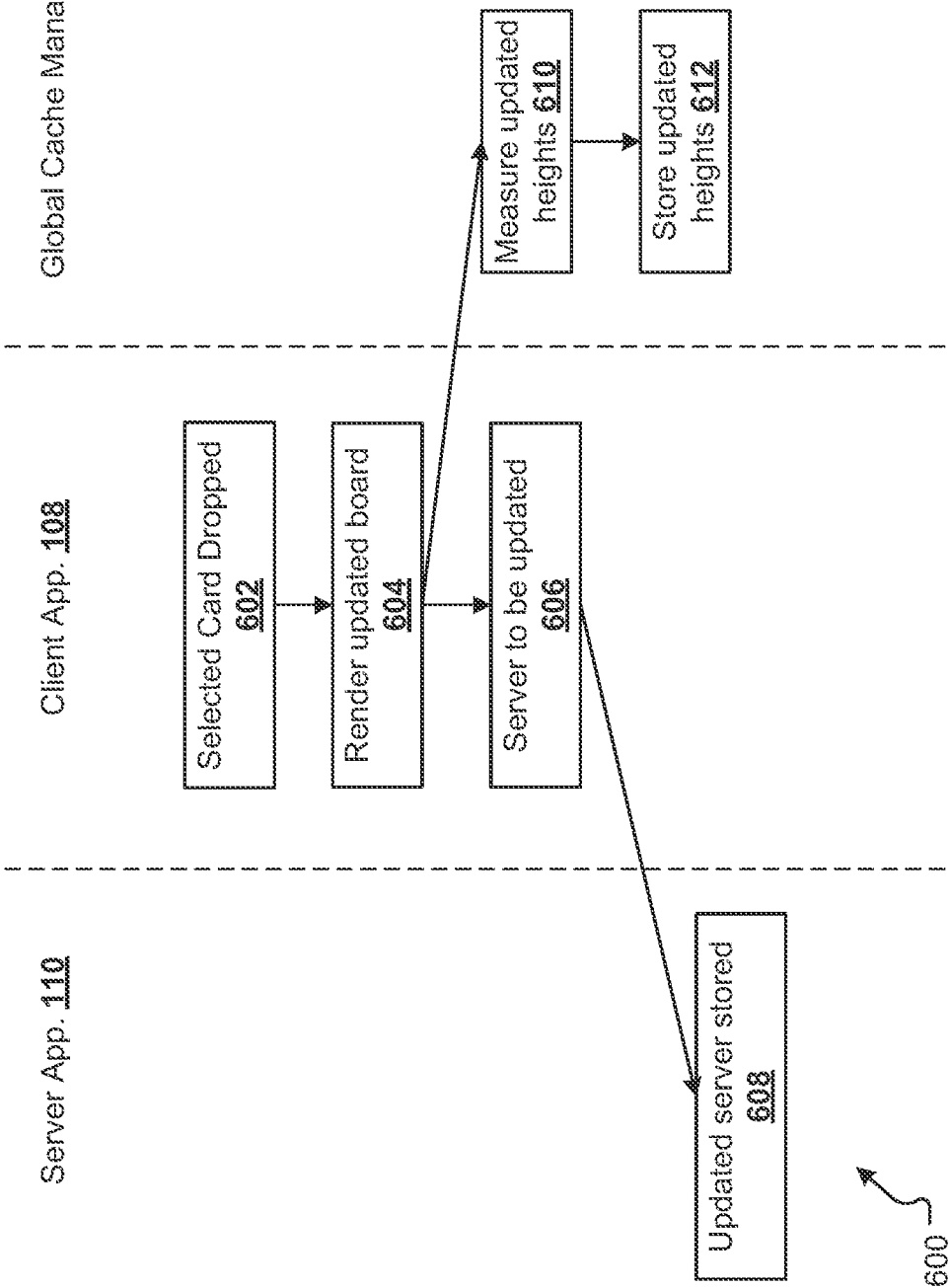
FIG. 6 provides a flowchart indicating data flows of operations performed when rendering the display of FIG. 3E.

Referring to FIG. 6, a data flow process 600 of the rendering of the example of FIG. 3E showing a card event is described. As noted above, the illustration of FIG. 3E follows on from the illustration of FIG. 3C. The method commences at 602, when a card event is detected. For example, in the case of FIG. 3E, the method commences when cursor 340 dragging card III is hovering on the list area overlaying list A and card III is dropped into list A 302 to take the space previously occupied by placeholder area 342, completing the state transition of card III from list B 304 to list A 302.

At step 604, the client application 108 optimistically renders board 300 based on the updated object tracking system data 116 to display to the user, board 300 of FIG. 3E. At 606, the completed transition or card event causes client application 108 to communicate the change of board 300 to the server application 110. For example, the client application 108 communicates the card identifier and the current state of the card to the server application 110.

At 608 the server application 110 updates the object tracking system data 116 in data storage 114 based on the received information.

Similar to 410, following the rendering of board 300, at 610, global cache manager 118 measures the heights (in terms of number of pixels) of each object (card) and state (list). That is, global cache manager 118 measures the heights of each of: List A 302 and the cards within list A 302, in this case card I 310 and card III 314; List B 304 and the card(s) within list B 304, in this case only card II 312; and List C 306 and the card(s) within list C 306, in this case only card IV 316.

Then, at 612, the local caches are updated based on the newly measured heights. The global cache manager holds the local caches.

It will be appreciated that a card event may also include amending the contents of a card which may result in the size of the card changing. For example, a card event will be completed if a picture is added to a card, as the size of the card will increase to display the added picture in the card. Such a card event will cause both the object tracking system data 116 in data storage 114 to be updated as well as global measurement cache 122 on the client device 102 to be updated.

Whilst FIGS. 3A to 3E show relatively simplistic examples with only three lists and four cards, it will be appreciated that virtual boards are able to include an unlimited number of lists and cards. For virtual boards that include a number of lists and cards that extend the board beyond the field of view of a display of client device 102, client application 108 shows what is presently in the field of view with vertical and/or horizontal scroll bars. The user can scroll using these bars or zoom out to view the entire board.

It will be appreciated that to increase rendering speed, client application 108 renders what is visible in the field of view and provides a rendering buffer of cards or lists that are adjacent the field of view so that the scrolling can be seamless such that the board will appear continuous to the user. As the user scrolls the board, heights of cards and lists that are scrolled away from the field of view are unloaded from the local caches such that only the height information of visible and buffered cards is maintained in the caches.

Further, regarding the rendering buffer, client application 108 may set a default buffer, for example, ten cards outside of the field of view, and this buffer can be update when the user scrolls the board based on what is in the field of view and what is adjacent the field of view at any given time. Yet further, client application 108 can detect the direction of scrolling and may only add cards to the rendering buffer in the direction of the scrolling and not in the other scrolling directions. For example, if a user is scrolling up a board, the rendering buffer may only be applied to cards in list that are above the field of view. In this case, there may be no need to apply the rendering buffer to the adjacent cards below the field of view, or to the left or right of the field of view. In further some embodiments, during the actual scrolling, client application 108 may only render a "lite" version (that is, less detail in the cards so less intensive to render) of the cards that are coming into the field of view with a full rich version (the card as it is intended to be rendered) being rendered once the scrolling action stops.

It will be appreciated that the actions and rendering processes are equally applicable to a board with cards and lists that extend beyond the field of view of the display of client device 102. Further, client application 108 may have an auto-scrolling function whereby when a user drags a card or list near the edge of the field of view, the board scrolls in that direction and the board is continuously rendered whilst the auto-scrolling is occurring just as if the full board was being shown.

In yet other embodiments, client application 108 is able to select a block of objects of the same object state, that is multiple adjacent cards from a single list, and transition or move the block of objects in a single action. The transitioning of the block of objects does not change the content of objects or the order of objects within the block. It will be appreciated that the rendering associated with the transitioning of the block of objects will be the same process as those described above for transitioning a single object at a time.

It will be further appreciated that the above described rendering processes ara also equally applicable to boards that include swimlanes. A swimlane is a horizontal categorization of objects/items/cards in a board. Swimlanes can be used to help distinguish tasks of different categories, such as workstreams, users, application areas, etc. For example, a team board may include swimlanes (horizontal categorization) and states (columns) to show tasks that are sorted based on team members. Each swimlane may be associated with a given team member.

In such boards, each swimlane group/column pair is considered a list and the global cache manager 118 stores local caches for each such list individually.

Although aspects of the present disclosure are described with reference to an object tracking application, it will be appreciated that this need not be the case. Aspects of the present application can be implemented in user interfaces associated with other types of software applications. For example, aspects of the present disclosure can be used in user interfaces associated with software applications that display interactive data in the form of tables, grids, or lists with interactive or movable objects within the tables, grids, or lists.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including," "includes," "comprising," "comprises," "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer-implemented method, comprising:
executing a web browser application on a client device, the web browser communicably coupled to a server application hosted by an object tracking system, the web browser application comprising a global cache manager having access to a data store separate from the browser application, the data store storing:
a global data cache; and
a set of local data caches each defined by a respective scope specific to a respective list element rendered in a user interface depicted by the web browser application;

sending, from the web browser application to the object tracking system, a request for virtual board data;
receiving, in response to the request to the object tracking system, the virtual board data;
storing the virtual board data in memory allocated to the web browser application;
rendering, using the virtual board data, a virtual board in the web browser application on a display, the virtual board including:
- a first list including a first list object of a first size; and
- a second list including a second list object of a second size different from the first size, the first list object and the second list object being transitionable between the first and second lists, each of the first and second lists including a droppable area within which a list object can be dropped, the first list object and the second list object each including at least a respective graphical object and a respective text object;

storing, by the global cache manager, a total size of the first list and the first size of the first list object of the first list in a first list cache of the set of local data caches;
storing, by the global cache manager, a total size of the second list and the second size of the second list object of the second list in a second list cache of the set of local data caches, each of the first list cache and the second list cache accessible to a rendering engine of the web browser application;
storing, by the global cache manager, the first size of the first list object and the second size of the second list object in the global data cache accessible to the rendering engine of the web browser application;
detecting, by the web browser application, selection of the first list object from the first list and movement of the selected first list object from the first list to a first current position within the droppable area of the second list;
obtaining, by the rendering engine of the web browser application from the global cache manager, the size of the selected first list object from the first list cache and adding the size of the selected first list object to the second list cache, the size of the first list object including a size of the respective graphical object and a size of the respective text;
updating the total size of the second list in the second list cache;
prior to a drop event of the first list object:
rendering and displaying a first placeholder area under the first current position within the droppable area of the second list, the first placeholder area having the same size as the size of the selected first list object; and
    rendering and displaying the second list having the updated total size of the second list including the size of the selected first list object;
in response to the drop event of the first list object at the second list:
insert the first list object at the first placeholder area, the inserted first list object having the same size as the first placeholder area; and
render and display the second list having the same size as the updated total size of the second list;
detecting selection of the second list object from the second list and movement of the selected second list object from the second list to a second current position within the droppable area of the first list;
obtaining, by the global cache manager, the size of the selected second list object from the second list cache and adding the size of the selected second list object to the first list cache, the size of the second list object including a size of the respective graphical object and a size of the respective text;
updating the total size of the first list in the first list cache; and
prior to a drop event of the second list object:
rendering and displaying a second placeholder area under the second current position within the droppable area of the first list, the second placeholder area having the same size of the size of the selected second list object; and
rendering and displaying the first list having the updated total size of the first list including the size of the selected second list object; and
in response to the drop event of the second list object at the first list:
insert the second list object at the second placeholder area, the inserted second list object having the same size of the second placeholder area; and
render and display the first list having the same size as the updated total size of the first list.

2. The computer-implemented method of claim 1, further comprising:
calculating respective list object sizes for each list object in the first and second lists.

3. The computer-implemented method of claim 1, further comprising:
in response to determining that the selected first list object is over the droppable area of the second list, rendering the first list without the selected first list object within the first list.

4. The computer-implemented method of claim 1, further comprising:
in response to determining that the selected first list object is over the droppable area of the second list, rendering a second placeholder area in the first list at an original location of the selected first list object in the first list, the second placeholder area having the same size as the size of the selected first list object.

5. The computer-implemented method of claim 1, wherein all list objects in the second list at or below the first placeholder area are transitioned down in the second list.

6. The computer-implemented method of claim 1, wherein when the first list object is selected from the first list and still hovering over an original location of the selected first list object, rendering a second placeholder area of the same size as the selected first list object at the original location of the selected first list object within the first list.

7. The computer-implemented method of claim 1, wherein the first and second lists are re-sized before the selected first list object is dropped in the second list.

8. A computer-implemented method, comprising:
executing a web browser application on a client device, the web browser application communicably coupled to a server application hosted by an object tracking system, the web browser application comprising a global cache manager having access to a data store separate from the web browser application, the data store storing:
a global data cache; and
a set of local data caches each defined by a respective scope specific to a respective one user interface element rendered in a user interface depicted by the web browser application;

sending from the web browser application to the object tracking system, a request for virtual board data;

receiving, in response to the request to the object tracking system, the virtual board data;

storing the virtual board data in-memory allocated to the web browser application;

rendering, using the virtual board data, a virtual board within the web browser application, the virtual board comprising at least:

a first column defining a first droppable area and comprising a first card defined by a first height, the first height stored by the global cache manager in a first local data cache of the set of local data caches; and a second column defining a second droppable area and comprising a second card defined by a second height different from the first height, the second height stored by the global cache manager in a second local data cache of the set of local data caches;

storing, by the global cache manager, the first height and the second height in the global data cache;

detecting by the web browser application, initiation by a cursor of a drag and drop operation in respect of the first card;

in response to detecting initiation of the drag and drop operation:

retrieve the first height from the global data cache as a first retrieved height;

causing a first placeholder object having the first retrieved height to be inserted at a first original position of the first card;

detecting by the web browser application that the cursor has exited the first droppable area and, in response:

removing the first placeholder object from the first column; and causing at least one other element of the first column to occupy area vacated by the first placeholder object;

detecting by the web browser application that the cursor has entered the second droppable area and is over the second card, and in response:

retrieve the first height from the global data cache as a second retrieved height;

causing the second card to move by a distance based on the second retrieved height;

causing a second placeholder object to be inserted within the second column within area vacated by the second card;

detecting by the web browser application that the drag and drop operation has ended and, in response, replacing the second placeholder object from the second column with the first card.

9. The computer-implemented method of claim 8, comprising:

in response to detecting by the web browser application that the drag and drop operation has ended, notifying a server application that the first card has moved from the first column to the second column.

10. The computer-implemented method of claim 8, wherein the global cache manager is configured to generate the set of local data caches, each respective local data cache storing height information of objects associated with each respective user interface element.

11. The computer-implemented method of claim 8, wherein in response to detecting by the web browser application that the drag and drop operation has ended, updating a first total height of the first column and a second total height of the second column within the global cache.

12. The computer-implemented method of claim 8, wherein determining and storing the first height and the second height in the global cache comprises determining a pixel height of the first card and second card respectively as rendered within the web browser application.

\* \* \* \* \*